June 19, 1956 M. A. KREITCHMAN ET AL 2,750,962
SOLENOID OPERATED VALVE STRUCTURE
Filed June 28, 1955 2 Sheets-Sheet 1

INVENTORS
MORTON A. KREITCHMAN
BENJAMIN P. WELT
BY MURRAY MASLOW
Albert Sperry
ATTORNEY INVENTORS
MORTON A. KREITCHMAN
BENJAMIN P. WELT
MURRAY MASLOW
BY Albert Sperry.
ATTORNEY great# United States Patent Office 2,750,962
Patented June 19, 1956

2,750,962

SOLENOID OPERATED VALVE STRUCTURE

Morton A. Kreitchman, West Orange, Benjamin P. Welt and Murray Maslow, South Orange, N. J.

Application June 28, 1955, Serial No. 518,604

4 Claims. (Cl. 137—625.48)

This application is a continuation in part of our copending application Serial No. 221,450, filed April 17, 1951, now abandoned.

This invention relates to valves and is directed particularly to constructions having a valve seat with a sealing element movable across the valve seat in a direction parallel to the plane of the valve seat.

Valves of this general type are usually referred to as gate valves or shear seal valves and have numerous advantages. In particular, they may be constructed with inlet and outlet ports which are aligned so that fluid passing through the valve is subjected to a minimum of turbulence and restriction to flow. However, when such valves are operated frequently it is difficult to maintain a satisfactory seal because of the extreme wear due to the frictional wiping engagement of the sealing element as it slides back and forth over the valve seat. Such wear is especially severe when the fluid controlled contains solid matter, such as dirt or grit, which tends to score the valve seat and sealing element and to wear down the surfaces thereof. Moreover, the frictional forces presented in sliding the sealing element across the valve seat have, heretofore, been such that relatively large or slow moving actuating means have been required to operate the valve, and as a result, the uses and applications of such valves has been greatly limited.

In accordance with the present invention, these objections to constructions of the prior art are overcome and means provided whereby the wear upon the valve seat and sealing element are reduced to a minimum. Moreover, the forces required to move the sealing element into and out of valve closing position are reduced to such an extent that small simple and inexpensive valve operating means, such as a solenoid, may be employed. In this way, shear seal valves have been rendered useful in aircraft and in many other applications wherein the weight and size of the valve must be limited while dependability in performance is of paramount importance.

The advantages of the present invention are preferably attained by providing the valve with a plunger or operating member movable in a plane parallel to the face of the valve seat and by providing a sealing element which is mounted in the plunger in such a way as to allow it to float relatively freely into and out of engagement with the valve seat. Moreover, the floating connection between the sealing element and plunger afford a lost motion effect whereby the sealing element is subjected to impact in operating the valve and is broken away from the valve seat so that it has limited engagement therewith during movement into and out of its sealing position, instead of being frictionally dragged across the surface of the valve seat.

The principal objects of the present invention are to reduce the size, weight, and cost of shear seal valves and to render them dependable in operation.

Another object of the invention is to provide a shear seal valve wherein there is a floating sealing element movable into and out of valve closing position.

A further object of the invention is to provide a shear seal valve capable of repeated and consistent operation by means of a solenoid.

A specific object of the invention is to provide a shear seal valve with a sealing element having a floating connection with a solenoid operated actuating means whereby the actuating means serves to subject the sealing element to impact in moving it into and out of valve closing position.

These and other objects and features of the present invention will appear from the following description thereof wherein reference is made to the figures of the accompanying drawings.

Figure 1:
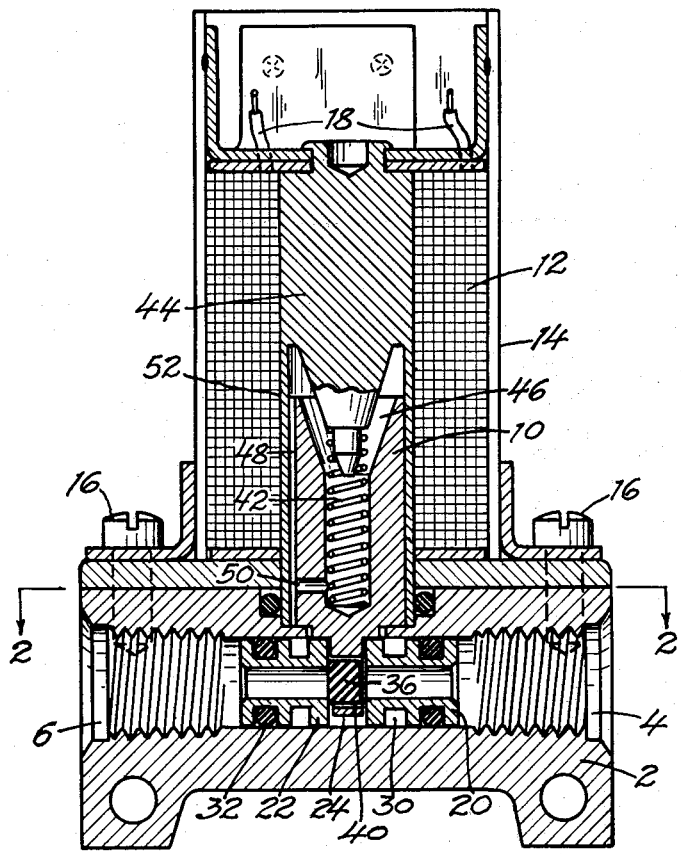
Fig. 1 is a vertical sectional view through a typical form of valve embodying the present invention.
Figure 2:
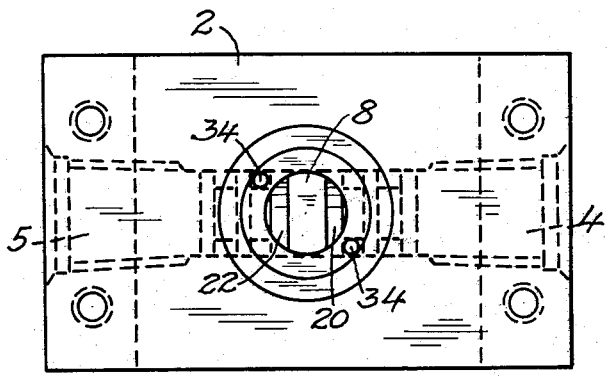
Fig. 2 is a plan view of the valve shown in Fig. 1 with the solenoid and actuating means removed as shown on line 2—2 of Fig. 1.
Figure 3:
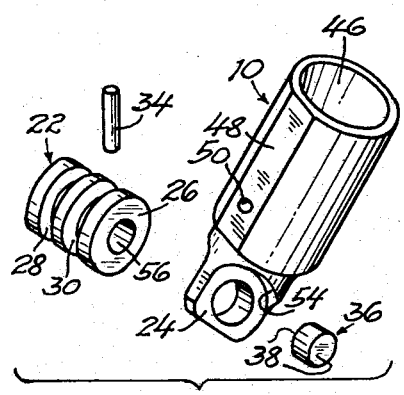
Fig. 3 is an exploded view of certain of the elements of the assembly illustrated in Fig. 1.

In that form of the invention chosen for purposes of illustration in Figs. 1, 2 and 3, the valve has a body 2 with an inlet port 4, an outlet port 5, and an opening 8 in the side of the body and between the inlet and outlet ports for receiving a valve actuating plunger 10. The plunger 10 is actuated by means of a solenoid 12 located within a housing 14 secured to the valve body 2 by the screws 16 or other suitable means. The solenoid is energized by electric current supplied through the conductors 18 or in any other preferred manner.

The valve illustrated in Figs. 1, 2 and 3 is provided with two valve seat members. One valve seat member is associated with the inlet port 4 and is indicated at 20, while the other valve seat member is associated with the outlet port 6 and indicated at 22. The valve seat members may be secured in place within the valve body in any suitable way so as to locate the two valve seats in parallel relation with a space therebetween into which the centrally positioned reduced end 24 of the plunger 10 is movable in actuating the valve. The valve seat member may be formed and secured in place in any suitable way but, as shown, each valve seat member is generally cylindrical and has a sliding fit within the inner cylindrical bore of the port with which it is associated. The inner end of each member presents a flat annular surface constituting the valve seat 26, whereas the cylindrical wall of each member is provided with two annular grooves indicated at 28 and 30. An O-ring 32 is positioned in groove 28 and is formed of compressible material such as rubber, neoprene or oil resistant resilient material for sealing the space between the valve seat member and the sides of the bore in which it is located. A positioning pin 34 extends through a hole in the valve body 2 and passes tangentially through the groove 30 to hold the valve seat member in place. In order to afford a limited amount of floating movement of the valve seat member, the pin 34 may be made somewhat smaller in diameter than the width of the annular groove 30 through which it passes. The floating or yieldable mounting of the valve seat member renders it possible to employ more generous tolerances in manufacture and further allows for limited adjustment in position of the valve seat 26 in sealing the valve. However, the valve seat member may be held rigidly in place if desired by use of a positioning pin of larger diameter or by press fitting of the valve seat member within the bore of the valve body.

The sealing element 36 is carried by the reduced end 24 of the plunger and preferably is formed of a dense, nonmetallic or plastic material such as graphite, or the fluorocarbon resin known as "Teflon," which have a low coefficient of friction when in engagement with metals and have relatively low specific gravity so as to be capable of floating easily from one position to another with the fluid being controlled. However, it may be formed of any other suitable material desired for a particular use or operation of the valve.

The sealing element is preferably generally cylindrical in shape presenting oppositely facing sealing surfaces 38 for engagement with the adjacent valve seats 26 when the valve is closed. The bore in the reduced end of the plunger in which the sealing element is located is of somewhat larger diameter or size than the sealing element so that there is looseness or play between the sealing element and plunger as indicated by the space 40. The sealing element is therefore free to float and adjust its position with respect to the plunger so as to insure effective sealing engagement of the sealing surface 38 with the valve seat 26. Moreover, the sealing element is movable under pressure of the fluid being controlled so that it is urged against the valve seat with greater pressure as the pressure at the inlet port is increased. However, if any back pressure should develop the sealing element is free to float within the bore of the plunger and across the space between the valve seats so as to engage the oppositely disposed valve seat and prevent reverse flow of the fluid being controlled.

The plunger 10 is preferably urged toward a normal sealing position by a spring 42, the upper end of which bears against the stationary core 44 of the solenoid 12 and the lower end of which extends into and bears against the bottom of a central recess 46 in the plunger. The lower end of core 44 is preferably tapered and the upper end of recess 46 is of conical form to insure the most effective action of the solenoid. The plunger 10 further may be formed with a flat side 48 and with a fluid passage 50 communicating with recess 46 so as to provide ample passageway for displacement of the fluid which flows upward about the plunger and into the sleeve 52 which guides the plunger during its movement into and out of valve closing position.

In order to insure proper guided movement and positioning of the reduced end 24 of the plunger so that the sealing element 36 will be properly aligned with the fluid passages 56 in the valve seat members 20 and 22, the plunger is preferably formed with downwardly facing arcuate surfaces 54 formed to engage the inwardly extending cylindrical surfaces of the valve seat members. With this construction, downward movement of the plunger under the action of spring 42 causes the arcuate surfaces 54 to engage the valve seat members and properly locate the sealing element 36. Moreover, if the plunger 10 should rotate about its axis during movement so as to present the sealing element at an angle to the axes of the fluid passages 56 in the valve seat members, the arcuate surfaces 54 will serve as cams to rotate the plunger about its axis and into proper oriented position. The sealing element 36 then will be positioned so that it can move freely under fluid pressure without danger of becoming cocked or jammed within the bore of the reduced end 24 of the plunger. Moreover, the construction renders it unnecessary to provide any key way or other means which would offer frictional resistance to movement of the plunger in order to overcome axial rotation thereof.

In operating the valve described, the plunger 10 is urged to its normal valve closing position as shown in Fig. 1 wherein the sealing element 36 is positioned to engage valve seat 26 of valve seat member 22 under the pressure of fluid entering through the inlet port 4. Fluid also is present in the passages 48 and 50 and between the upper end of the plunger and the core 44 of the solenoid. Furthermore, the sealing element 36 is in engagement with the upper side of the bore in the reduced end 24 of the plunger leaving the space 40 between the sealing element and the lower side of said bore.

When the solenoid 12 is energized the plunger 10 is moved upward against the action of spring 42 so as to raise the reduced end 24 of the plunger and move the sealing element 36 to valve opening position. The solenoid when energized exerts an almost instantaneous impulse on the plunger in moving it upward, whereas the space 40 between the sealing element 36 and the sides of the bore in the plunger allows the plunger to gain momentum before it engages the sealing element. As a result, the sealing element is struck a sharp blow in an upward direction along a line parallel to but spaced from the line of contact between the valve seeat 26 and the sealing surface 38 as indicated by the line 58 in Fig. 4. The opposite free end of the sealing element then tends to move upward within the space 40 which is then located above the sealing element as shown at 40a in Fig. 4. The sealing element is thereby tilted as shown in dotted lines in Fig. 4, and accordingly, the only point of frictional contact between the sealing surface 38 and valve seat 26 is that adjacent the upper edges thereof as indicated at 60. Moreover, the space 62 between the lower edge of the sealing surface 38 and valve seat 26 is enlarged by such tilting movement of the sealing element permitting more ready flow of fluid to the opposite side of the sealing element and more rapid equalization of the pressure on opposite sides of the sealing element. The sealing element is thus released from the valve seat almost instantly and is freed to float easily with the plunger to the valve opening position without being frictionally dragged across the surface of the valve seat. Wear on the sealing element and valve seat is thereby reduced to a minimum and repeated operation of the valve over long periods of time is made possible. Moreover, the force required to actuate the plunger and open the valve is so reduced that a very small, light weight and inexpensive solenoid may be used and the size and weight of the whole assembly may be limited sufficiently to render such valves useful in aircraft and other locations where gate valves or shear seal valves have not heretofore been practical.

During upward movement of the plunger 10 toward the core 44 of the solenoid the fluid within the space between these elements can flow easily through the passages 48 and 50 to the interior of the valve body without impeding the movement of the plunger although the size of the ports may be chosen so as to afford a limited dash-pot action, if desired.

After the valve has been opened the fluid can, of course, flow directly from the inlet port to the outlet port with a minimum of turbulence and resistance to flow and as long as the solenoid remains energized. When the valve is to be closed the solenoid is de-energized and spring 42 urges the plunger downward. The sealing element 36, by inertia, then engages the upper side of the bore in the plunger leaving space 40 below the sealing element. As the plunger approaches the valve closing position the arcuate surfaces 54 engage the cylindrical projecting ends of the valve seat members and align the bore in the reduced end of the plunger with the fluid passages 56 in the valve seal members. The sealing element is then free to move with respect to the plunger and toward the valve seat member 22 in the outlet port under the pressure of the fluid being controlled and can adjust its position with respect to the valve seat 26 so as to insure proper and effective sealing engagement of the surface 38 therewith.

The relative adjustments in position of the sealing element and valve seat member are further aided by the yielding support and mounting of the valve seat members 20 and 22 within the inner cylindrical bores of the inlet and outlet ports. The pressure of the sealing element against the valve seat 26 then tends to tilt or adjust the position of the valve seat member as may be needed to insure the most effective sealing engagement of the sealing surface 38 with the valve seat 26.

In the event, any back pressure or hammering of fluid should develop in a system controlled by the valve of the type shown in Figs. 1, 2 and 3, the sealing element 36 will float back and forth between the valve seat members 20 and 22 and within the bore of the reduced end 24 of the plunger to engage whichever valve seat is on the low pressure side. In this way the valve functions as a check valve as well as a flow control valve and is particularly useful in fuel control and engine lubricating lines or other locations wherein back-fire or other back pressures may occur.

Figure 5:
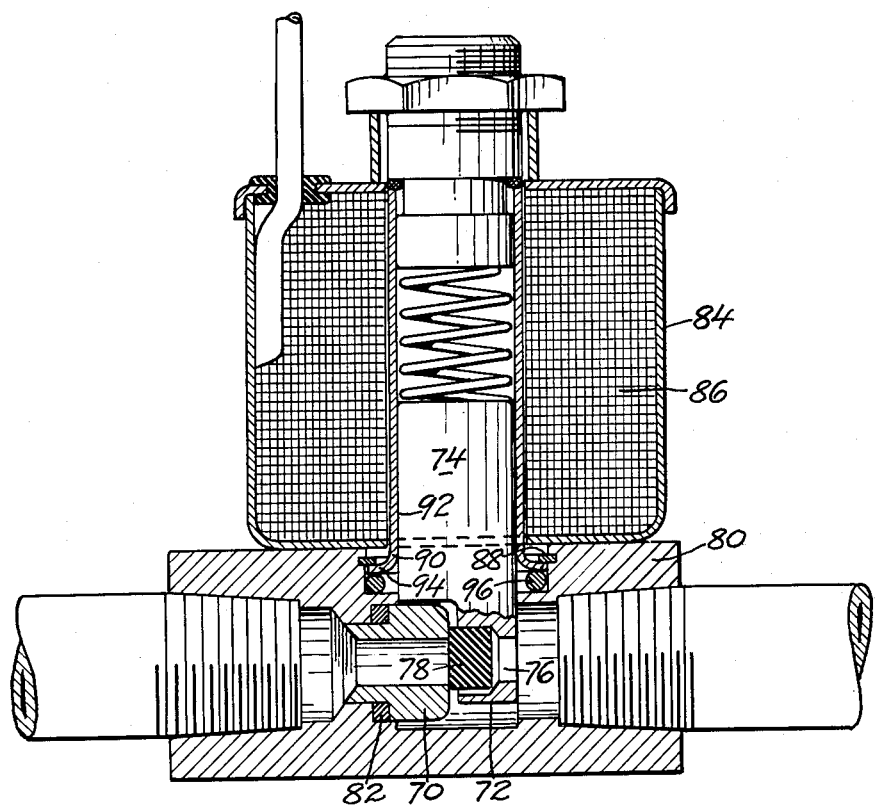
Fig. 5 is a vertical sectional view through an alternative form of valve embodying the present invention.

The valve illustrated in Fig. 5 is essentially similar in construction and operation to the valve shown in Figs. 1, 2 and 3 and described above. However, the valve is provided with only a single valve seat member 70 and the reduced end 72 of plunger 74 is located at one side of the plunger and provided with an opening 76 therein through which the pressure of the fluid being controlled is applied to the sealing element 78. The valve seat member 70 as shown has a sliding fit within the valve body 80, but is sealed against leakage by a sealing ring 82 formed of compressible material. However, if preferred, the valve seat member may have a forced fit with the body or be formed integral therewith.

Further, in the construction of Fig. 5, the housing 84 for the solenoid 86 is secured to the body 80 of the valve by means of a split ring 88 surrounding the projecting lower end 90 of the plunger guiding sleeve 92. For this purpose, the extremity of the end 90 of the sleeve is formed with an outwardly extending flange 94 and the valve body 80 is formed with a recess which serves to receive and hold the split ring 88 in retaining engagement with flange 94. A sealing ring 96 is positioned beneath the flange 94 and serves to prevent leakage of fluid between the valve body and the sleeve of the solenoid assembly.

Figures 4, 6:
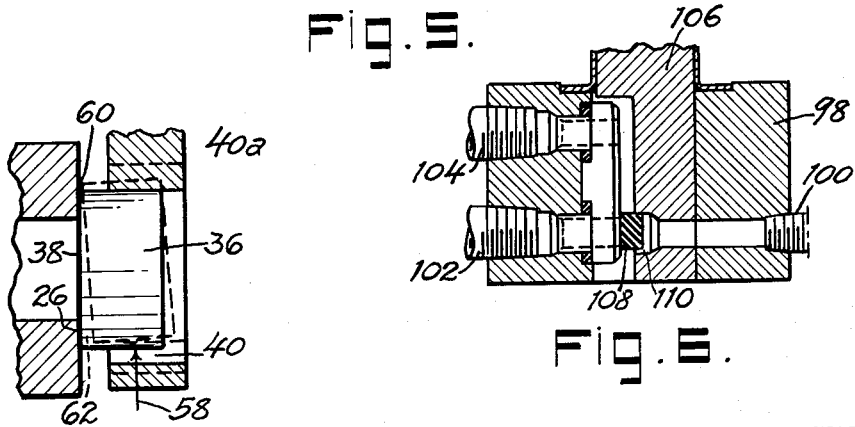
Fig. 4 is a diagrammatic illustration indicating the manner of operation of a valve embodying the present invention.
Fig. 6 is a sectional view through a portion of a further alternative embodiment of the invention.

The construction illustrated in Fig. 6 is designed for use as a two-way valve wherein fluid entering the valve body 98 through inlet port 100 may be caused to flow to either of the outlet ports 102 or 104 as desired. The plunger 106 carries a floating sealing element 108 which is movable to a lowered position to seal the outlet port 102 to a raised position to seal the outlet port 104.

When in the lowered position the fluid entering inlet port 100 flows through the space 110 between the plunger and sealing element and about the plunger to the outlet port 104 while urging the sealing element into sealing engagement with the valve seat of outlet port 102. When raised the sealing element 108 is moved into sealing engagement with the valve seat of outlet 104 and held in engagement therewith by fluid pressure while the fluid flows directly from the inlet port 100 to outlet port 102.

In each of the forms of the invention described, the free floating character of the sealing element reduces the friction presented and the wearing of the parts to a minimum. Moreover, the element is preferably a disc or of a cylindrical form and the lost motion effect of the loose connection between the sealing element and the plunger serves to apply an impact to the sealing element which serves to break it away from the valve seat and aid in releasing it for free movement with the plunger.

On the other hand, the movement of the sealing element with reference to the valve seat affords sufficient wiping action to remove dirt and foreign matter from the valve seat without scoring or pitting of the valve seat or sealing element even when the fluid being controlled contains considerable dirt or grit.

While various forms of the present invention have been shown and described, the invention is capable of embodiment in numerous other forms and types of valves. Moreover, the various elements of the assembly may be changed in form, construction and arrangement. In view thereof it should be understood that the particular embodiments shown in the drawings and described above are intended to be illustrative only and are not intended to limit the scope of the invention.

We claim:

1. An impact opened, spring closed pressure responsive gate valve comprising in combination a valve body having a chamber therein provided with inlet and outlet ports, a valve seat member for said outlet port, a solenoid including a plunger passage communicating with said chamber and having an axis extending substantially at right angles to the axis of said outlet port and parallel to but spaced from the plane of said sealing surface, a spring in said passage, a plunger movable by said spring axially of said passage and having a portion extending into said chamber, a bore extending transversely of said portion and registerable with the outlet port upon movement of said plunger by said spring to a valve closing position, a sealing element having a flat sealing face and loosely fitted within said bore to permit pressure responsive movement of the element toward said seat and having an edge spaced from the side of said bore to provide lost motion axially of the plunger between the plunger and the edge of the sealing element, whereby when the solenoid is energized to open the valve the plunger is moved against the action of said spring and has an initial free motion with respect to said sealing member causing the plunger to strike the edge of the sealing element and displace it by impact from said sealing surface.

2. A gate valve of the character defined in claim 1, wherein the inlet and outlet ports are each provided with a valve seat member and present substantially parallel sealing surfaces between which said portion of the plunger is movable to dispose the sealing element between said sealing surfaces for engagement with either surface depending upon the direction in which pressure is exerted on the sealing element.

3. A gate valve of the character defined in claim 1, wherein the valve seat member is yieldably supported within the outlet port to afford adjustment in position of said sealing surface and insure effective sealing of the valve by said sealing element.

4. A gate valve of the character defined in claim 1, wherein the valve seat member and the plunger have complementary surfaces engageable when the plunger is urged toward its valve closing position to align the bore in the plunger with the outlet port.

References Cited in the file of this patent

UNITED STATES PATENTS

| | | |
|---|---|---|
| 468,878 | Johnstone | Feb. 16, 1892 |
| 1,160,790 | Vampa | Nov. 16, 1915 |
| 1,382,412 | Campbell | June 21, 1921 |
| 1,448,409 | Kindl | Mar. 13, 1923 |
| 1,654,642 | Geissinger | Jan. 3, 1928 |